US009517924B2

United States Patent
Meyer et al.

(10) Patent No.: US 9,517,924 B2
(45) Date of Patent: Dec. 13, 2016

(54) SINGLE HANDLE, DUAL-FLOW FAUCET

(71) Applicants: Michael H. Meyer, Sagamore Hills, OH (US); Michael A. Kolar, North Royalton, OH (US)

(72) Inventors: Michael H. Meyer, Sagamore Hills, OH (US); Michael A. Kolar, North Royalton, OH (US)

(73) Assignee: The Meyer Company, Cleveland, OH (US)

( * ) Notice: Subject to any disclaimer, the term of this patent is extended or adjusted under 35 U.S.C. 154(b) by 0 days.

(21) Appl. No.: 14/525,210

(22) Filed: Oct. 27, 2014

(65) Prior Publication Data

US 2015/0114998 A1    Apr. 30, 2015

Related U.S. Application Data

(60) Provisional application No. 61/896,591, filed on Oct. 28, 2013.

(51) Int. Cl.
| | | |
|---|---|---|
| B67D 3/00 | (2006.01) | |
| B67D 1/14 | (2006.01) | |
| B67D 3/04 | (2006.01) | |
| F16K 31/00 | (2006.01) | |
| B67D 1/00 | (2006.01) | |

(52) U.S. Cl.
CPC ............ *B67D 3/0016* (2013.01); *B67D 3/043* (2013.01); *F16K 31/00* (2013.01); *B67D 1/0082* (2013.01); *B67D 1/1466* (2013.01); *B67D 3/0061* (2013.01); *B67D 2001/0089* (2013.01);

(Continued)

(58) Field of Classification Search
CPC ..... B67D 3/0016; B67D 3/043; B67D 3/0061; B67D 1/0083; B67D 1/1466; B67D 1/0082; B67D 2001/0089; F16K 31/00; F16K 35/025; F16K 41/103; F16K 35/00; Y10T 137/7043; Y10T 137/6851; Y10T 137/87684; Y10T 137/87917; Y10T 137/87925

See application file for complete search history.

(56) References Cited

U.S. PATENT DOCUMENTS

| | | | | |
|---|---|---|---|---|
| 1,419,386 A | * | 6/1922 | Kelly .................. | B67D 1/0082 222/133 |
| 1,517,744 A | * | 12/1924 | Moneuse ............. | B67D 1/0082 137/584 |

(Continued)

*Primary Examiner* — Frederick C Nicolas
(74) *Attorney, Agent, or Firm* — Fay Sharpe LLP

(57) ABSTRACT

A liquid dispensing faucet includes first and second inlet flow passages that are isolated from each other, and first and second valve chambers respectively in fluid communication with the first and second inlet flow passages. First and second valve elements are located respectively in the first and second valve chambers and respectively control flow of liquid from the first and second inlet passages through the first and second valve chambers. First and second outlet passages are respectively in fluid communication with the first and second valve chambers for respectively receiving and dispensing liquid from the first and second valve chambers. A handle is operatively connected to both the first and second valve elements for selectively opening the first and second valve elements to allow flow of liquid through the first and second valve chambers when the handle is moved from a first position to a second position.

18 Claims, 8 Drawing Sheets

(52) U.S. Cl.
CPC .................. *Y10T 137/87684* (2015.04); *Y10T 137/87917* (2015.04); *Y10T 137/87925* (2015.04)

(56) References Cited

U.S. PATENT DOCUMENTS

| | | | | |
|---|---|---|---|---|
| 1,789,390 | A * | 1/1931 | Potteiger | 137/625.16 |
| 2,675,018 | A * | 4/1954 | Bender | B67D 1/0083 137/381 |
| 2,888,040 | A * | 5/1959 | Terwilliger | B67D 1/0083 137/607 |
| 3,710,981 | A * | 1/1973 | Arzberger | B67D 1/0044 137/607 |
| 4,077,545 | A * | 3/1978 | Karls | E03C 1/0411 137/339 |
| 4,473,088 | A * | 9/1984 | Dotter | G05D 11/003 137/111 |
| 4,564,128 | A * | 1/1986 | Belich | B67D 1/1466 222/135 |
| 4,881,664 | A | 11/1989 | Kawolics | |
| 4,927,061 | A | 5/1990 | Leigh et al. | |
| 5,449,144 | A | 9/1995 | Kowalics | |
| 5,944,225 | A | 8/1999 | Kawolics | |
| 6,554,165 | B2 * | 4/2003 | Cote | B65D 1/0276 222/129.1 |
| 6,648,186 | B2 | 11/2003 | Roethel et al. | |
| 6,868,994 | B2 | 3/2005 | Kawolics | |
| 6,908,071 | B2 | 6/2005 | Roethel et al. | |
| 8,418,991 | B2 | 4/2013 | Meyer et al. | |
| 8,418,992 | B2 | 4/2013 | Meyer et al. | |
| 8,955,723 | B2 * | 2/2015 | Minica | B67D 1/0083 222/129.1 |

* cited by examiner

SINGLE HANDLE, DUAL-FLOW FAUCET

CROSS-REFERENCE TO RELATED APPLICATION

This application claims priority from and benefit of the filing date of U.S. provisional application Ser. No. 61/896,591 filed Oct. 28, 2013, and the entire disclosure of said provisional application is hereby incorporated by reference into the present specification.

BACKGROUND

It has been deemed desirable in certain liquid dispensing applications to increase the flow rate at which a beverage or other liquid or flowable food product or other flowable substance, such as condiments or the like, are dispensed from a faucet. Examples of such applications are fast-food operations or sports or other entertainment concession stands where speed of customer service is critical. At the same time, it has also been deemed desirable to provide a high-flow faucet that operates in a one-handed and otherwise simple manner. As such, a need has been identified for a liquid dispensing faucet that increases the flow rate of liquid being dispensed while also being easily controlled in a one-handed manner. Another need has been identified for a faucet that can be operated with one hand and that facilitates mixing of liquids or other flowable products from two separate sources only at the time when the liquids are dispensed into an associated cup or other container.

SUMMARY

In accordance with one aspect of the present development, a liquid dispensing faucet includes a first faucet portion comprising a first faucet body and a second faucet portion comprising a second faucet body. The first and second faucet bodies include respective inner ends adapted to be connected to an associated liquid container. The first and second faucet bodies include respective first and second valve portions including respective first and second valve chambers. The first and second faucet bodies further include respective inlet flow passages defined therein that extend from an inlet defined in the respective inner end to the respective first and second valve chambers. The first and second valve chambers include respective first and second valve seats. The liquid dispensing faucet further includes at least one liquid outlet passage in fluid communication with the first and second valve chambers, and the at least one liquid outlet passage provides a flow path for dispensing liquid from the first and second valve chambers. First and second valve elements are located respectively in the first and second valve chambers and adapted to mate with the respective first and second valve seats to block flow of liquid from the respective inlet passages to the respective first and second valve chambers. The first and second valve elements are selectively separable from the respective first and second valve seats to allow flow of liquid from the respective inlet passages into the respective first and second valve chambers. A handle is operably connected to each of said first and second valve elements. The handle is adapted for manual movement from a first position to a second position, wherein the first and second valve elements are mated with their respective first and second valve seats to block fluid flow when the handle is located in its first position, and the first and second valve elements are separated from their respective first and second valve seats to allow fluid flow when the handle is located in its second position. First and second springs are respectively engaged with the first and second valve elements for biasing the first and second valve elements into engagement with their respective first and second valve seats.

In accordance with another aspect of the present development, a liquid dispensing faucet includes first and second inlet flow passages that are isolated from each other, and first and second valve chambers respectively in fluid communication with the first and second inlet flow passages. First and second valve elements are located respectively in the first and second valve chambers and respectively control flow of liquid from the first and second inlet passages through the first and second valve chambers. First and second outlet passages are respectively in fluid communication with the first and second valve chambers for respectively receiving and dispensing liquid from the first and second valve chambers. A handle is operatively connected to both the first and second valve elements for selectively opening the first and second valve elements to allow flow of liquid through the first and second valve chambers when the handle is moved from a first position to a second position.

BRIEF DESCRIPTION OF DRAWINGS

FIG. 1 shows a single handle, dual-flow faucet according to one embodiment of the present development and operatively connected to a container that holds a volume of a beverage or other flowable food or beverage product such as iced tea, water, coffee, or the like;

DETAILED DESCRIPTION

Figure 1:
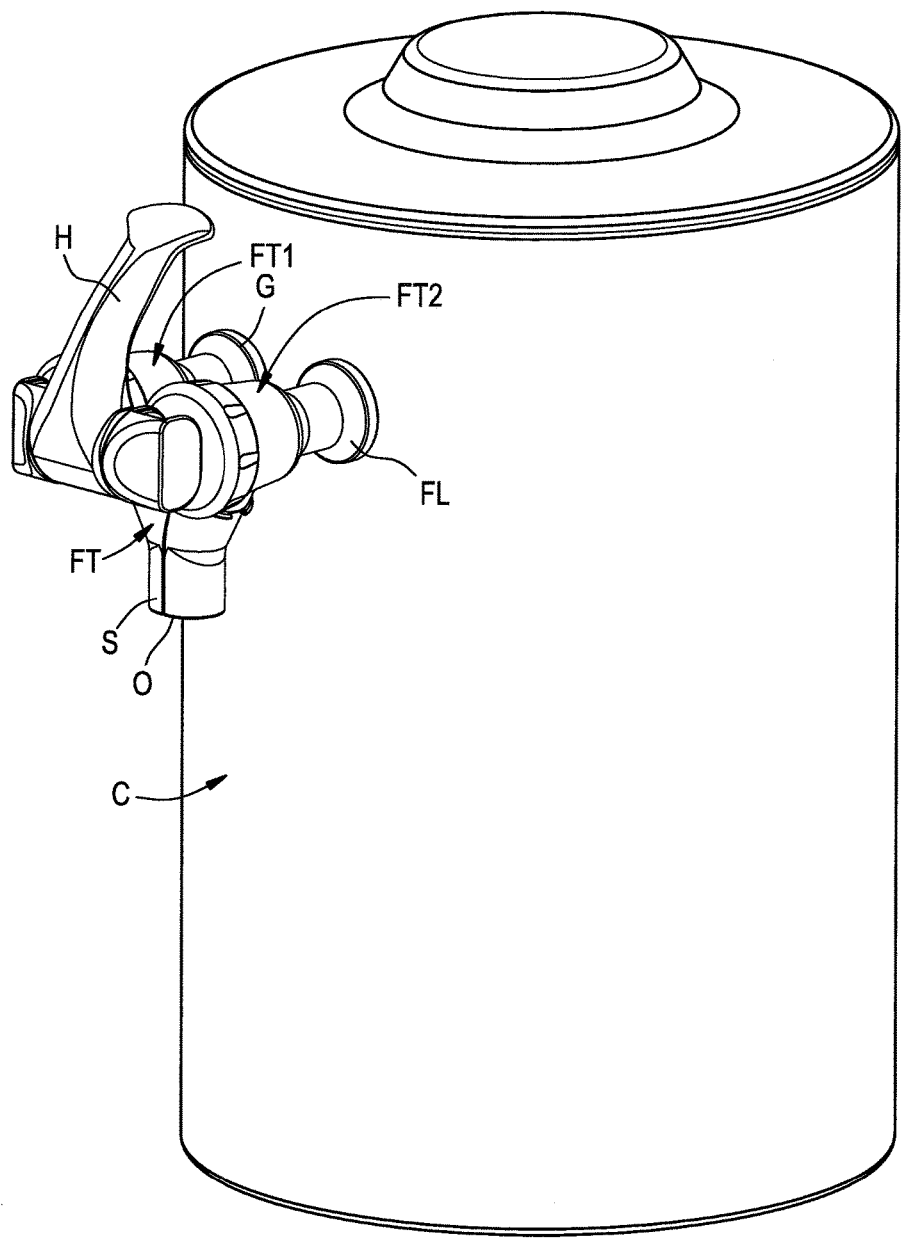
Figure 2:
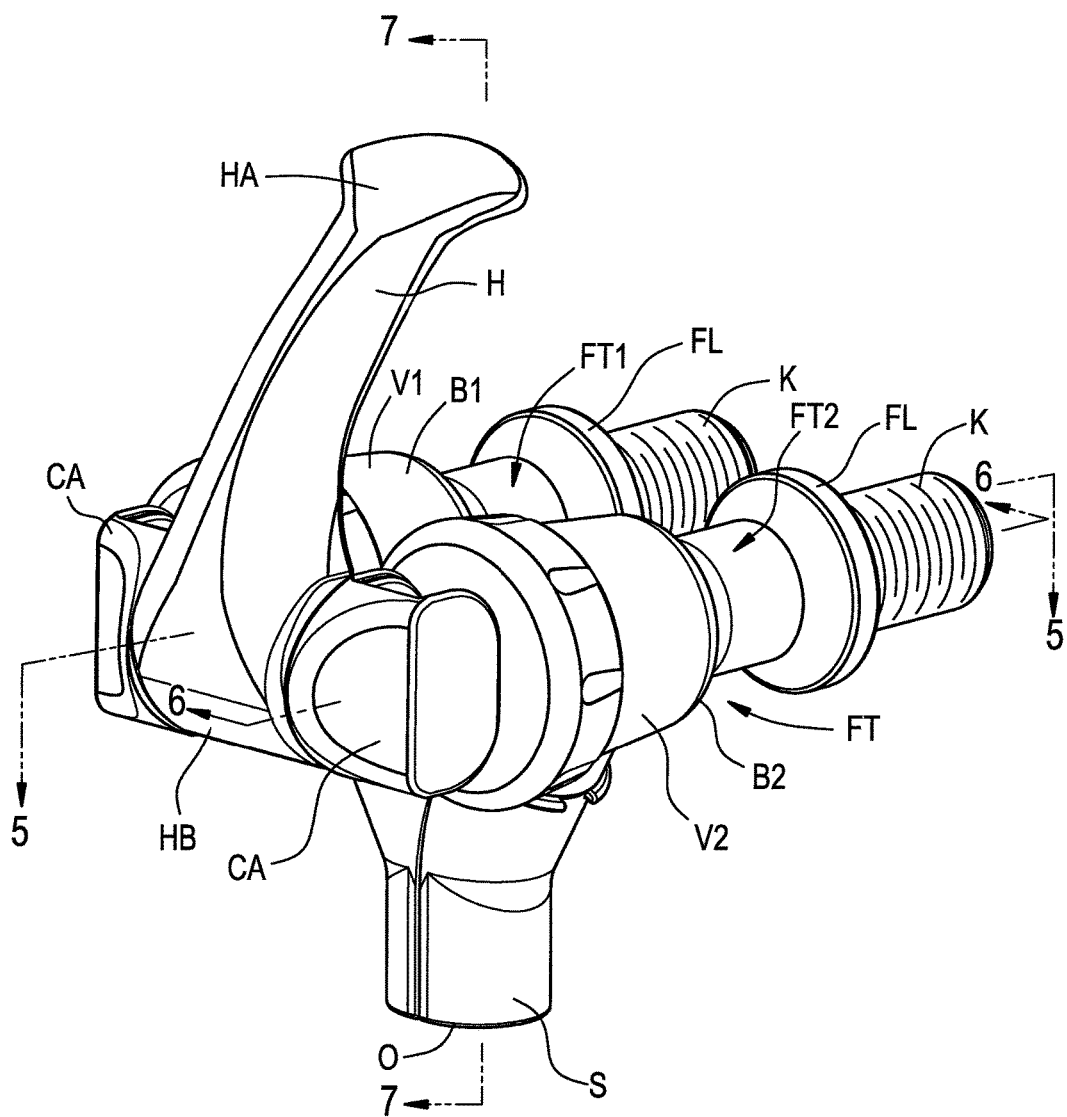
FIG. 2 shows the faucet of FIG. 1 by itself.
Figure 3:
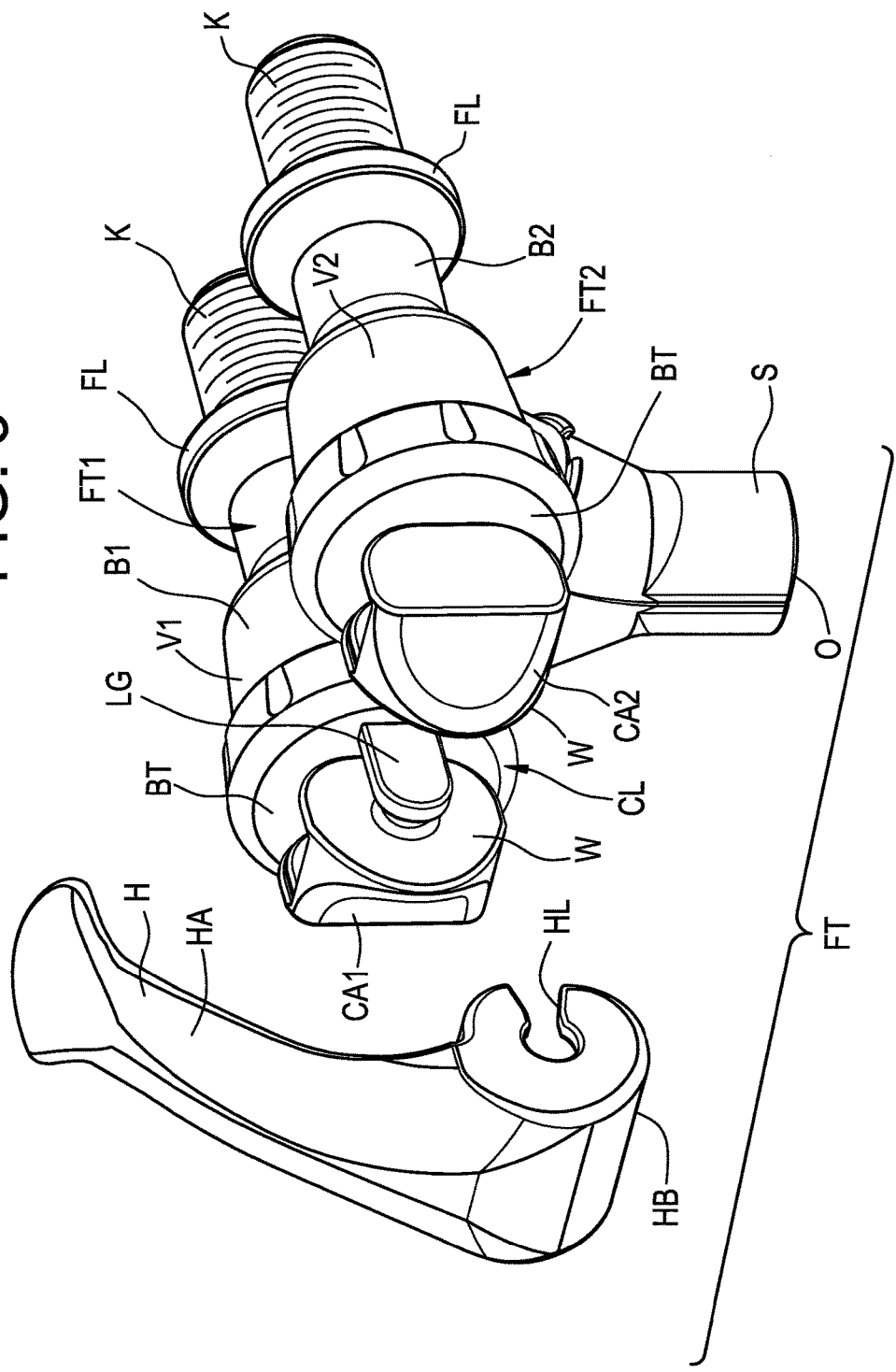
FIG. 3 is similar to FIG. 2 but shows the handle exploded from the faucet.
Figure 4:
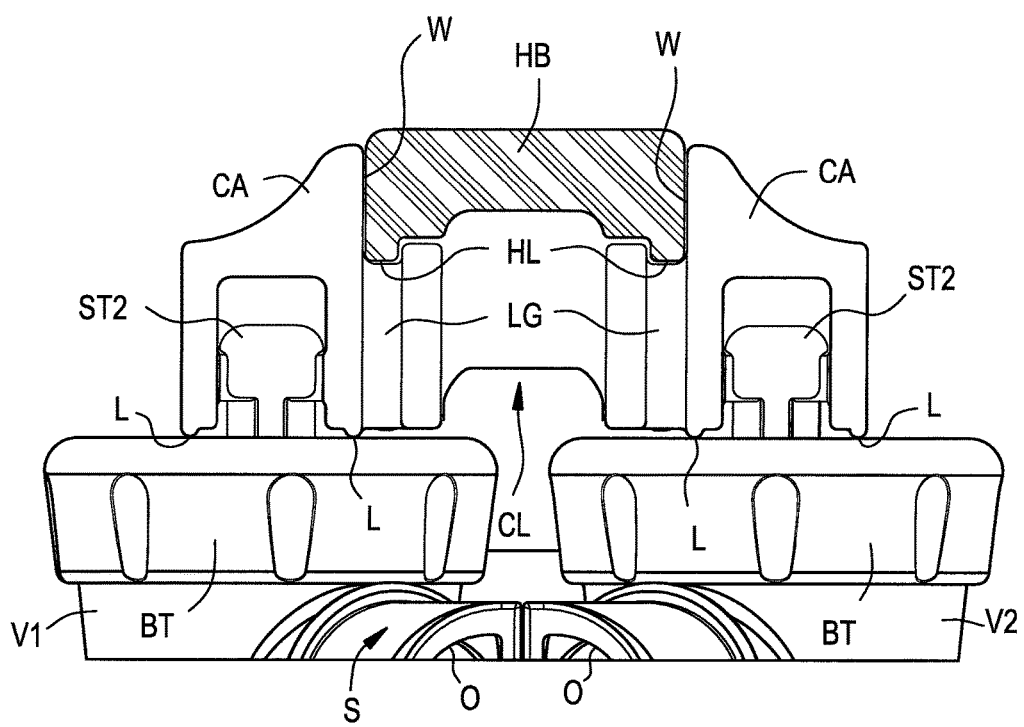
FIG. 4 is a partial bottom view of the faucet of FIG. 2.

FIG. 1 shows a single handle, dual-flow faucet FT according to the present invention operatively connected to a container C that holds a volume of a beverage or other flowable food or beverage product such as iced tea, water, coffee, etc. The faucet FT includes a single handle H that is manually operated by a user in order to open the faucet FT in order to dispense liquid from the container C into a cup or other container by way of a spout S of the faucet FT. Unlike known faucets, the faucet FT comprises a first (or left) portion FT1 a second (or right) portion FT2 (see also FIGS. 2 and 3), each of which includes a separate flow passage and valve element for controlling fluid flow between the container C to the spout S. FIG. 2 shows the faucet FT by itself, and FIG. 3 is similar but shows the handle H exploded from the faucet FT.

Referring to all of FIGS. 1-4, the first and second faucet portions FT1,FT2 comprise respective first and second faucet body portions or faucet bodies B1,B2 (generally B) each comprising a shank K or other mating structure at its inner end that is adapted to be connected to the container C by any suitable means such as a mating nut being threaded onto external threads of the shank or by any other known faucet connection structure and method. As shown, each body B1,B2 comprises a flange FL that abuts an external surface of the container C.

Figure 5:
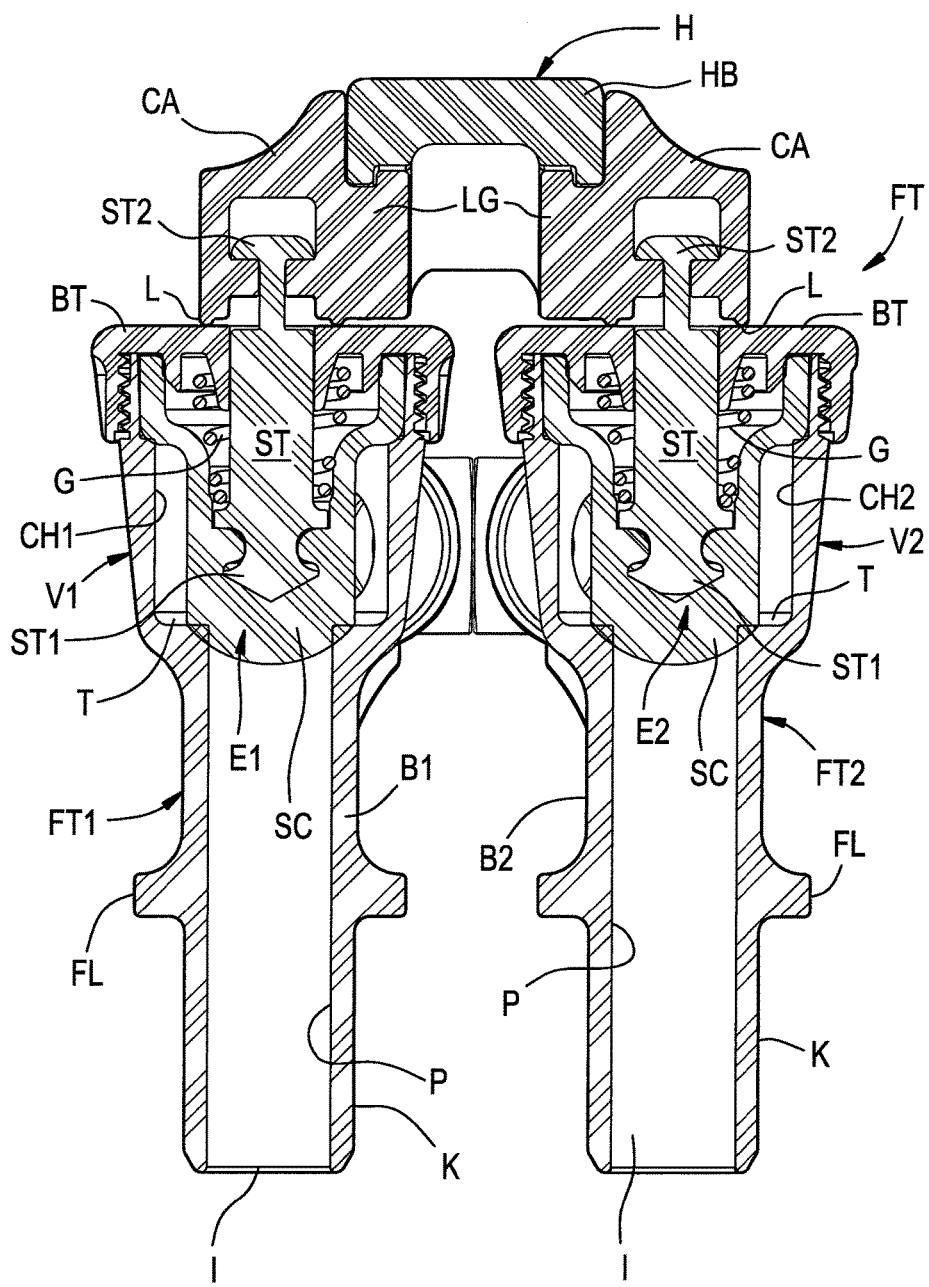
FIG. 5 is a section view through the faucet as taken at line 5-5 of FIG. 2.
Figure 6:
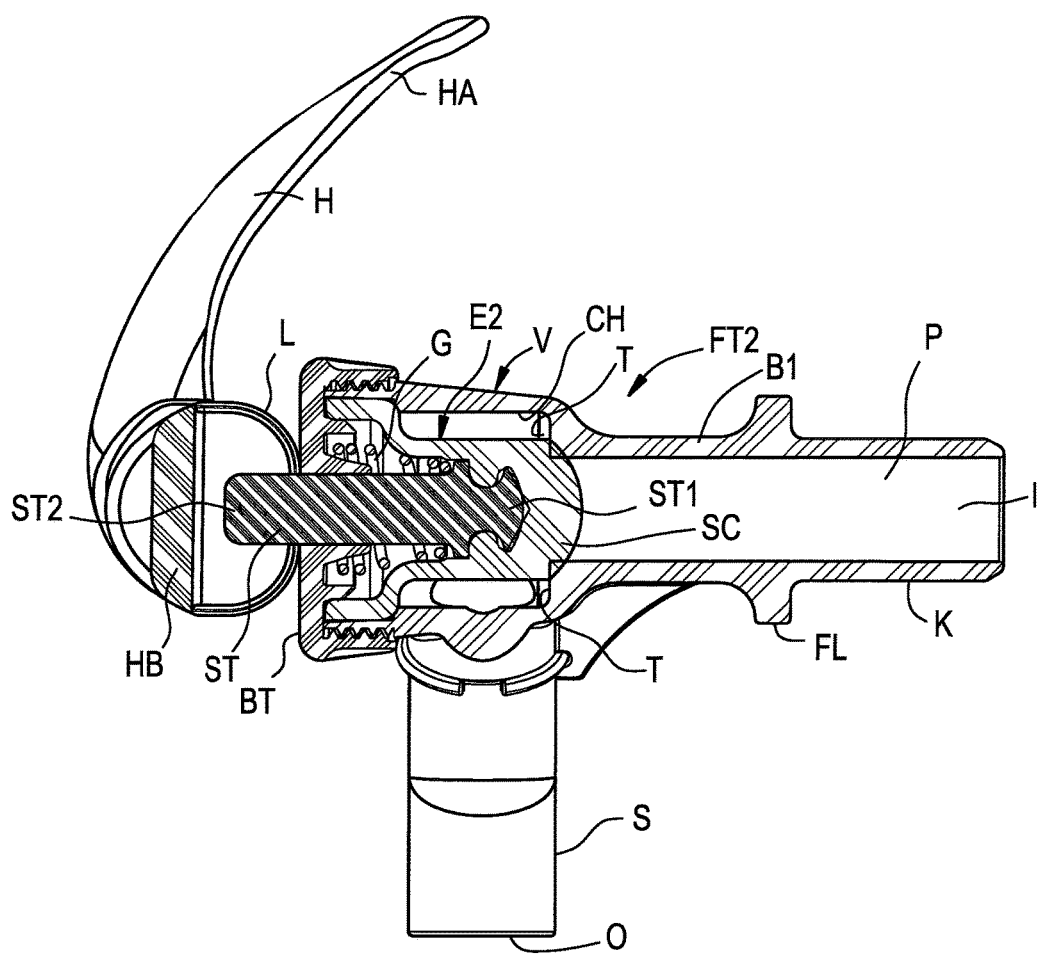
FIG. 6 is a section view through the faucet (specifically, the second faucet portion thereof) as taken at line 6-6 of FIG. 2.
Figure 7:
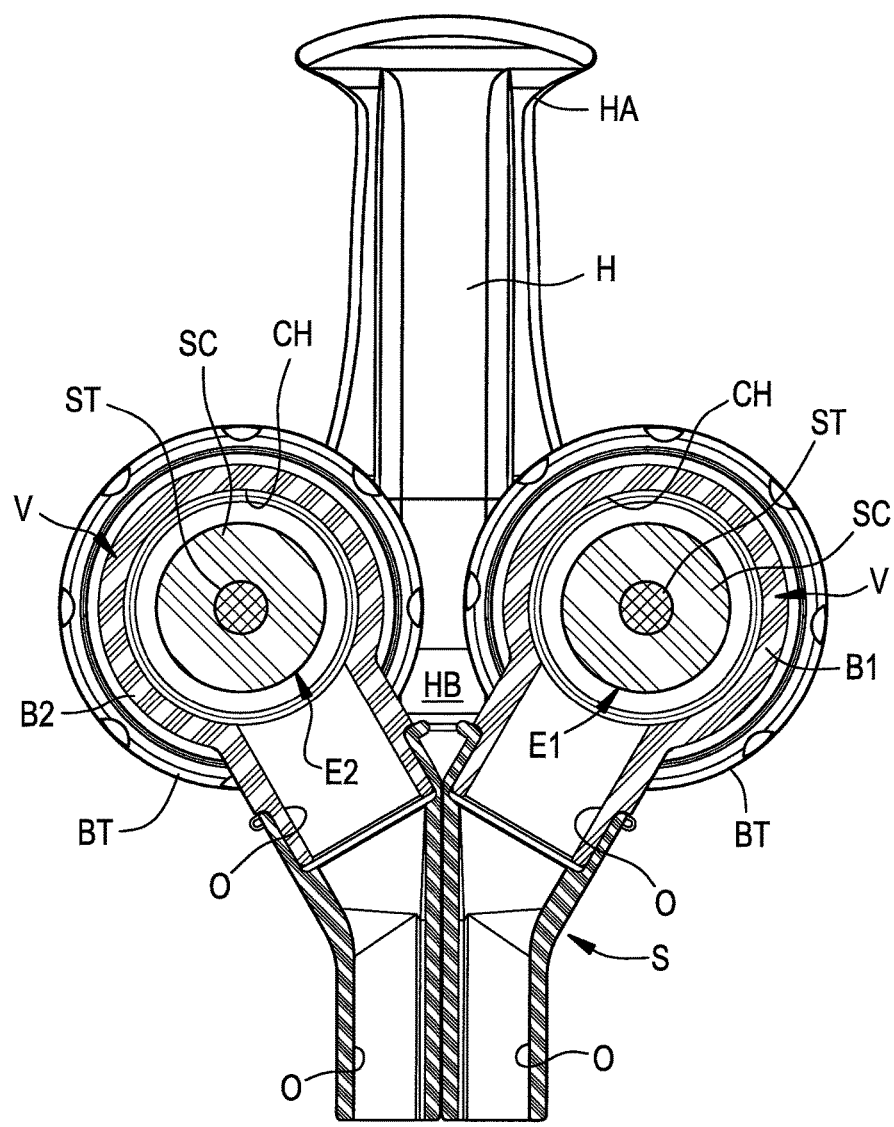
FIG. 7 is a section view through the faucet as shown at line 7-7 of FIG. 2.

FIG. 5 is a section view through the faucet FT as taken at line 5-5 of FIG. 2. FIG. 6 is a section view taken through the second faucet portion FT2 at line 6-6 of FIG. 2. FIG. 7 is a section view through the faucet FT as shown at line 7-7 of FIG. 2.

With particular reference to FIGS. 5 and 6, the first and second faucet bodies B1,B2 comprise respective first and second valve portions or first and second valve chamber portions V1,V2 that comprises or defines a valve chamber CH. An inlet flow passage P is defined in and extends through each faucet body B1,B2, and the respective inlet flow passages P are isolated from each other. Each inlet flow passage P extends from an inlet I (FIGS. 5 & 6) defined in the shank K or other portion of the inner end to the valve chamber CH. The valve chamber CH comprises or defines a valve seat T situated adjacent the location where the passage P intersects the valve chamber CH, i.e., the first and second valve portions V1,V2 comprise respective first and second valve seats T located respectively in the first and second valve chambers CH1,CH2. Liquid from the container C flows into the inlet flow passage P via inlet I in the region of the shank K or other part of the inner end of the faucet body B1,B2 and flows through the passage P, past the valve seat T, and into the valve chamber CH. External access to the first and second valve chambers CH is provided by respective removable first and second bonnets BT that are threaded or otherwise removably connected to the respective first and second faucet bodies B1,B2 in covering relation with the respective first and second valve chambers CH to close or enclose the respective valve chambers CH when installed. The first and second bonnets BT form part of the first and second faucet bodies B1,B2, respectively, when operably installed to close the respective valve chamber CH. The valve chamber CH of the first faucet body B1 can be referred to as the first valve chamber CH1, and the valve chamber CH of the second faucet body B2 can be referred to as the second valve chamber CH2 as labeled in FIG. 5.

The spout S of the faucet FT comprises one or more liquid outlet passages O that are in fluid communication with respective or both the valve chambers CH of the first and second faucet portions FT1,FT2 and that open externally through the spout S in order to dispense liquid from the valve chambers CH by way of the spout S into a cup or other associated container for use or consumption. Alternatively, the valve chambers CH of the first and second faucet portions FT1,FT2 comprise respective spouts connected thereto with respective outlet passages defined in the separate spouts. In the illustrated embodiment, as best seen in FIG. 7, the respective separate outlet passages O of the first and second faucet portions FT1,FT2 remain fluidically disconnected from each other as they extend through the spout S, and each outlet passage O opens externally through the spout S for dispensing liquid. In either case, at least one liquid outlet passage O is in fluid communication with each valve chamber CH.

The first and second valve portions V1,V2 further comprise respective first and second valve elements E1,E2 that selectively mate with the respective valve seat T to block the flow of liquid from the respective passage P into the respective valve chamber CH, and that are selectively movable away from or separable/separated from the respective valve seat T in order to allow the flow of liquid from the respective inlet passage P into the respective valve chamber CH.

In the illustrated embodiment, the first and second valve elements E1,E2 each comprise a resilient elastomeric seat cup SC operably connected to a respective valve first and second valve stems ST. A first or inner end ST1 of each valve stem ST is engaged with the seat cup SC. The valve stem ST projects out of the valve chamber CH through an aperture defined in the bonnet BT such that an opposite second or outer end ST2 of the stem ST is located external to the respective valve chamber CH and external to the respective faucet body B1,B2. Respective first and second coil springs G are coaxially positioned about the first and second valve stems ST, or other biasing means are provided within each the valve chamber CH and engaged between the bonnet BT and the valve stem ST and/or seat cup SC, in order to bias the seat cup SC into sealing engagement with the valve seat T to provide a closed position for the faucet FT in which the seat cup SC blocks the flow of liquid from the passage P into the valve chamber CH. As such, first and second springs G are respectively engaged with the first and second valve elements E1,E2 to bias the first and second valve elements toward engagement with the respective valve seats T of the first and second valve chambers CH.

In the illustrated embodiment, the liquid dispensing faucet FT further comprises first and second cam actuators CA respectively pivotally connected or engaged with the second ends ST2 of the first and second valve stems ST and located adjacent the respective first and second bonnets BT. The first and second cam actuators CA are separately labeled as CA1,CA2 in FIG. 3 for reference. Each cam actuator CA comprises a lobed portion L that bears against an outer surface of the bonnet BT and that is shaped such that pivoting movement of the cam actuator CA relative to the second end ST2 of the respective stem ST to which it is connected will cause the cam actuator CA to pull the stem ST outward relative to the valve chamber CH against the biasing force of the spring G such that the seat cup SC connected to the first end ST1 of the stem ST is pulled away from the valve seat T to provide an opened position for the faucet FT in which liquid can flow into the valve chamber CH from the inlet flow path P. Once liquid flows into the valve chamber CH, it can flow freely by gravity to the outlet passages O of the spout S.

Figure 8:
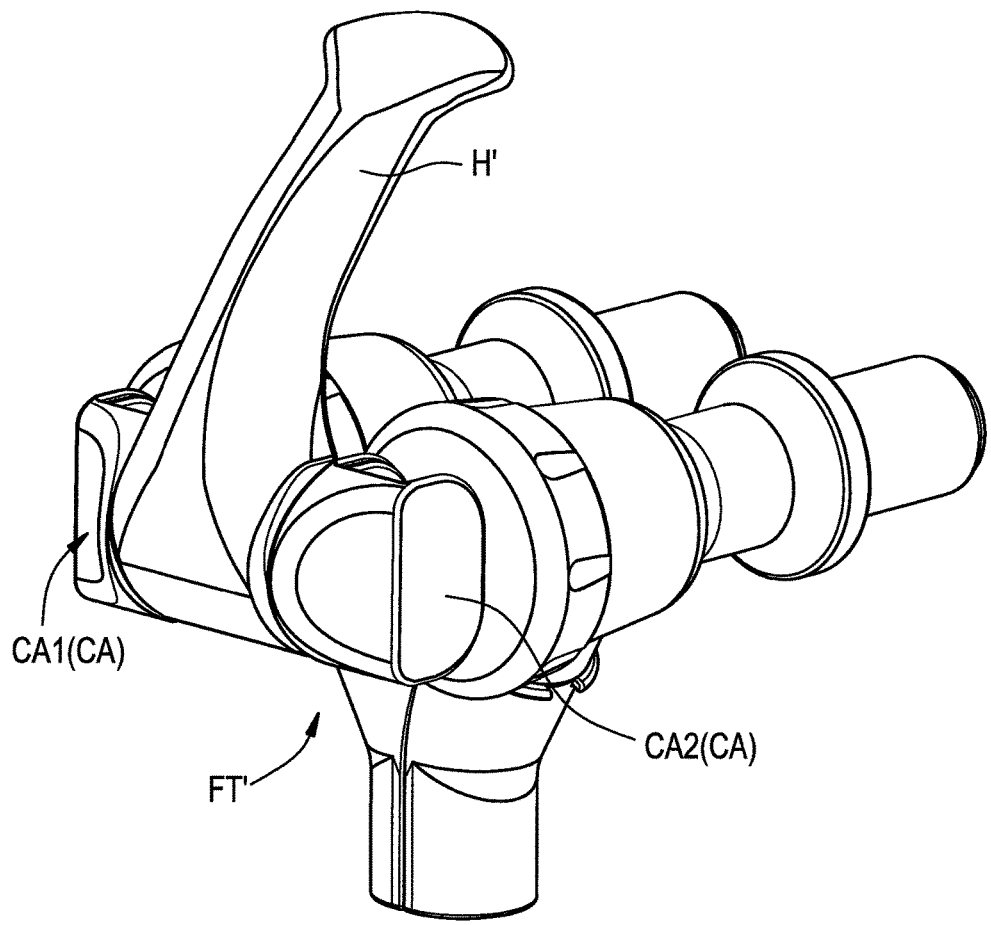
FIG. 8 is similar to FIG. 2 but shows an alternative embodiment in which the handle and first and second cam actuators are connected as a one-piece construction.

Although each cam actuator CA can be connected to a separate handle (which can optionally be tied together by a bar or web or other structure to move in unison), it is preferred that that the faucet FT comprise a single handle H operably connected to both the first and second cam actuators CA and, thus, to both the first and second valve elements E1,E2. The handle H moves between a first position, corresponding to the closed state of the faucet in which the valve elements E1,E2 are mated with the respective valve seats T to block fluid flow into the respective valve chamber CH, and a second position, corresponding to the opened state of the faucet in which the valve elements E1,E2 are separated from the respective valve seats T to allow fluid flow into the respective valve chamber CH. In the illustrated embodiment, the cam actuators CA comprise respective inner walls W oriented toward each other and that define a channel CL (FIG. 3) between themselves. The cam actuator CA comprise respective lugs LG that project from the respective walls W inwardly toward each other into the channel CL. The handle H comprises a base HB that is dimensioned to fit into the channel CL closely between the walls W. The handle base HB comprises first and second lug-engaging notches or portions HL that are snap-fit or otherwise engaged with the lugs LG of the respective cam actuators CA when the handle H is operatively connected to the cam actuators CA. The handle notches HL engage the lugs LG non-rotatably, i.e., in a manner that prevents relative rotation between the handle base HB and the lugs LG. As such, when a user manually pushes or pulls on the actuator portion HA of the handle H to move the handle H from the first position to the second position, the handle base HB rotates and causes both cam actuators CA to rotate together therewith so that the respective lobed portions L of the cam actuators CA bear against the bonnets BT to cause outward linear translation of the first and second valve stems ST away from the respective valve seats T. This outward linear translation of the valve stems ST pulls the valve stems ST outward relative to the valve chambers CH in order to move the first and second seat cups SC out of sealing engagement with the respective valve seats T in order to open both the first and second faucet portions FT1,FT2 simultaneously and allow liquid to flow from the inlet passages P into the valve chambers CH, where the liquid can then flow freely to the outlet passages O of the spout S in order to be dispensed from the spout S. When the user releases the handle H or manually moves the handle back to its first position, the springs G bias the valve elements E1,E2 back into sealing engagement with the respective valve seats T and bias the handle back to its first position, which corresponds with inward linear translation of the first and second valve stems ST toward the respective first and second valve seats T. The cam actuators CA can alternatively be provided as part of the handle H, for example as a one-piece structure such as a molded polymeric structure, or the cam actuators CA can be provided as part of the handle H in a multi-piece sub-assembly. FIG. 8 is similar to FIG. 2 but shows one such alternative faucet embodiment FT' comprising a handle H' that is defined as a one-piece molded polymeric structure that includes the first and second cam actuators CA' (CA1', CA2') defined as a part thereof. Otherwise, the faucet FT' is identical to the faucet FT.

Modifications and alterations will occur to those of ordinary skill in the art to which the invention pertains upon reading and understanding this specification. It is intended that the claims be construed as encompassing all such modifications and alterations to the maximum possible consistent with maintaining validity of the claims.

The invention claimed is:

1. A liquid dispensing faucet comprising:
 a first faucet portion comprising a first faucet body and a second faucet portion comprising a second faucet body, said first and second faucet bodies comprising respective inner ends adapted to be connected to an associated liquid container;
 said first and second faucet bodies comprising respective first and second valve portions including respective first and second valve chambers;
 said first and second faucet bodies further comprising respective inlet flow passages defined therein that extend from an inlet defined in the respective inner end to the respective first and second valve chambers;
 said first and second valve chambers comprising respective first and second valve seats;
 at least one liquid outlet passage in fluid communication with the first and second valve chambers, the at least one liquid outlet passage providing a flow path for dispensing liquid from the first and second valve chambers;
 first and second valve elements located respectively in the first and second valve chambers and adapted to mate with the respective first and second valve seats to block flow of liquid from the respective inlet passages to the respective first and second valve chambers, said first and second valve elements selectively separable from the respective first and second valve seats to allow flow of liquid from the respective inlet passages into the respective first and second valve chambers;
 a handle operably connected to each of said first and second valve elements, said handle adapted for manual movement from a first handle position to a second handle position, wherein said first and second valve elements are mated with the respective first and second valve seats to block fluid flow when the handle is located in the first handle position and wherein said first and second valve elements are separated from the respective first and second valve seats to allow fluid flow when the handle is located in the second handle position.

2. The liquid dispensing faucet of claim 1, further comprising:
 first and second springs respectively engaged with said first and second valve elements for biasing said first and second valve elements into engagement with their respective first and second valve seats.

3. The liquid dispensing faucet as set forth in claim 2, further comprising:
 first and second valve stems connected respectively to the first and second valve elements, said first and second valve stems comprising respective outer ends located outside the first and second valve chambers and engaged with said handle such that movement of said handle from said first position to said second position causes outward movement of said first and second valve stems and said first and second valve elements away from the first and second valve seats, respectively.

4. The liquid dispensing faucet as set forth in claim 3, wherein the first and second faucet bodies comprise respective first and second bonnets respectively connected thereto to enclose the first and second valve chambers, respectively, and wherein the first and second bonnets include respective apertures through which the first and second valve stems extend.

5. The liquid dispensing faucet as set forth in claim 4, further comprising first and second cam actuators respectively pivotally connected to outer ends of the first and second valve stems and located respectively adjacent the first and second bonnets, said first and second cam actuators comprising respective lobed portions that bear against respective outer surface of the first and second bonnets, wherein each lobed portion is shaped so that pivoting movement of the first and second cam actuators relative to the respective outer ends of the first and second valve stems to which they are connected causes outward linear translation of the first and second valve stems away from the first and second valve seats, respectively, to provide an opened position for the faucet in which liquid can flow into the respective first and second valve chambers from the inlet flow paths respectively in communication with the first and second valve chambers.

6. The liquid dispensing faucet as set forth in claim 5, wherein the first and second cam actuators are connected to the handle and move with the handle when the handle moves to and between its first and second positions.

7. The liquid dispensing faucet as set forth in claim 6, wherein the handle and the first and second cam actuators are defined as a one-piece construction.

8. The liquid dispensing faucet as set forth in claim 6, wherein the handle comprises a base that is releasably connected to the first and second cam actuators.

9. The liquid dispensing faucet as set forth in claim 8, wherein the first and second cam actuators define a channel between themselves and comprise respective lugs that project into said channel, and wherein the handle base is located in said channel and non-rotatably engaged with the lugs of the first and second cam actuators.

10. The liquid dispensing faucet as set forth in claim 4, wherein the first and second valve elements comprise respective elastomeric seat cups.

11. The liquid dispensing faucet as set forth in claim 10, wherein the first and second springs comprise respective first and second coil springs that are respectively coaxially positioned about the first and second valve stems and positioned respectively between the first and second seat cups and the first and second bonnets.

12. The liquid dispensing faucet as set forth in claim 1, further comprising at least one spout in which said at least one liquid outlet passage is defined.

13. The liquid dispensing faucet as set forth in claim 1, wherein said at least one liquid outlet passage comprises first and second separate outlet passages respectively in fluid communication with the first and second valve chambers.

14. A liquid dispensing faucet comprising:
   first and second inlet flow passages that are isolated from each other;
   first and second valve chambers respectively in fluid communication with the first and second inlet flow passages;
   first and second valve elements located respectively in the first and second valve chambers that respectively control flow of liquid from the first and second inlet passages through the first and second valve chambers;
   first and second outlet passages respectively in fluid communication with the first and second valve chambers for respectively receiving and dispensing liquid from the first and second valve chambers;
   a handle operatively connected to both the first and second valve elements for selectively opening the first and second valve elements to allow flow of liquid through the first and second valve chambers when the handle is moved from a first handle position to a second handle position;
   wherein the first and second valve elements comprise respective elastomeric seat cups operatively connected to respective first and second valve stems, each of said first and second valve stems comprising an outer end operatively connected to said handle such that manual movement of said handle from said first handle position to said second handle position causes linear translation of both said first and second valve stems to unseat said first and second seat cups; and,
   wherein said handle is operably connected to said first and second valve stems through respective first and second cam actuators that are pivotally connected respectively to the outer ends of the first and second valve stems.

15. The liquid dispensing faucet as set forth in claim 14, wherein the first and second cam actuators are defined together with said handle as a one-piece construction.

16. The liquid dispensing faucet as set forth in claim 14, wherein said first and second cam actuators are defined separately from each other and separately from said handle and are each operably connected to said handle.

17. The liquid dispensing faucet as set forth in claim 16, wherein a channel is defined between said first and second actuators, and wherein a portion of said handle is located in said channel.

18. The liquid dispensing faucet as set forth in claim 17, wherein said first and second cam actuators include respective lugs connected thereto and projecting into the channel, and wherein said handle is releasably engaged with said lug of both said first and second cam actuator.

* * * * *